(12) United States Patent
Atmur

(10) Patent No.: US 7,113,850 B2
(45) Date of Patent: Sep. 26, 2006

(54) METHOD AND APPARATUS FOR ACTIVE ACOUSTIC DAMPING MOTOR CONTROL

(75) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 10/728,224

(22) Filed: Dec. 3, 2003

(65) Prior Publication Data

US 2005/0125114 A1 Jun. 9, 2005

(51) Int. Cl.
*G01K 11/16* (2006.01)
*H03B 1/04* (2006.01)

(52) U.S. Cl. .............................. 701/1; 701/21; 701/34; 318/71.1; 318/71.4

(58) Field of Classification Search ............ 701/1, 701/21, 29, 31, 34, 35; 318/254, 727, 439, 318/71.4, 71.1
See application file for complete search history.

(56) References Cited

U.S. PATENT DOCUMENTS

| | | | |
|---|---|---|---|
| 4,751,438 A * | 6/1988 | Markunas | 318/254 |
| 5,291,194 A | 3/1994 | Ames | |
| 5,477,674 A * | 12/1995 | Somers et al. | 60/415 |
| 5,646,366 A | 7/1997 | O'Connell | |
| 5,748,102 A | 5/1998 | Barron | |
| 5,994,868 A * | 11/1999 | Takeuchi et al. | 318/616 |
| 6,331,759 B1 | 12/2001 | Atmur | |
| 6,482,054 B1 | 11/2002 | Treaster et al. | |
| 6,536,365 B1 | 3/2003 | Horton | |
| 6,564,110 B1 * | 5/2003 | Makino et al. | 700/56 |
| 6,600,695 B1 | 7/2003 | Nugent et al. | |
| 6,642,683 B1 | 11/2003 | Atmur | |
| 2003/0001538 A1 | 1/2003 | Atmur | |
| 2003/0103771 A1 | 6/2003 | Atmur et al. | |
| 2003/0218438 A1 | 11/2003 | Atmur | |
| 2004/0114768 A1 * | 6/2004 | Luo et al. | 381/71.4 |

OTHER PUBLICATIONS

Helduser, S., and Bonefeld, R., *Active Damping in Civil Engineering Using Hydraulic Actuators*, Institute of Fluid Power and Motion control, Dresden University of Technology, Germany, date is not available.
Stekl, Petr, and Kubiczek, Zdenek, *Low-Cost, 3-Phase, AC Motor Control System with Power Factor Correction Based on MC68HC908MR32*, Motorola Czech System Application Laboratory, Roznov pod Radhostem, Czech Republic, 2001, month is not available.

(Continued)

*Primary Examiner*—Tan Q. Nguyen
(74) *Attorney, Agent, or Firm*—Ingrassia Fisher & Lorenz, P.C.

(57) ABSTRACT

Active acoustic damping is provided with a motor or similar propulsive element such as a multi-phase brushless direct current (DC) motor. To produce the appropriate canceling effect with the motor, the relationship between the operating mode of the motor and the noise produced is observed. This data can be used to identify a relevant transfer function that can be applied to produce a control signal for the motor. For a multi-phase motor, the current control signals provided to at least one phase may be made asymmetric with respect to the other phases to produce actuating forces upon the motor. This actuating force can be used to modify acoustic signals produced by the motor. The active acoustic damping techniques may be applied in any vehicles or devices, including unmanned underwater vehicles (UUVs), in either an open loop or closed loop manner.

20 Claims, 3 Drawing Sheets

OTHER PUBLICATIONS

De Mendonca, R.G., Neto, L. Martins, Camacho, J.R., *The Oscillating Torque On A Three-Phase Induction Generator Connected To A Single-Phase Distribution System*, Electrical Machines Laboratory, Electrical Engineering Department Universidade Federal de Uberlandia, Brazil, date is not available.

Visinka, Radim, *Low Cost 3-Phase AC Motor Control System Based on MC68HC908MR24*, Roznov System Application Laboratory, Motorola, Czech Republic, 1998, month is not available.

Brushless DC (BLDC) Motor, [online] . Retrieved from Internet: <URL: www.motorola.com/webapp/sps/site/overview>, date is not available.

3-Phase AC Induction Motor, [online] , Retrieved from Internet: <URL: www.motorola.com/webapp/sps/site/overview>, date is not available.

* cited by examiner

METHOD AND APPARATUS FOR ACTIVE ACOUSTIC DAMPING MOTOR CONTROL

TECHNICAL FIELD

The present invention generally relates to active acoustic damping. More particularly, the invention relates to apparatus and techniques for actively damping acoustic noise using a motor or other propulsive element.

BACKGROUND

Most people are exposed to many types of undesirable acoustic disturbances every day in both indoor and outdoor environments. Such acoustic "noise" includes undesired audible sounds, but also mechanical vibrations or other acoustic disturbances as well. Common sources of acoustic noise include automobiles, airplanes, trains, motorcycles, lawn mowers, chain saws, construction equipment, ventilator systems and other industrial and commercial products. Typically, noise results from vibrations emanating from motors, blowers, pumps, fans or other components of such devices. In addition to being annoying to humans, different types of acoustic noise can affect the operation of vehicles (e.g. aircraft or seacraft) and other machines.

One technique for reducing the effects of noise, called "active acoustic damping", involves providing an additional sound, tone or other vibration to effectively cancel the undesired noise at a particular location. Active damping is commonly used on many vehicles, as well as in many industrial or commercial settings. Commercial aircraft, for example, commonly use active damping techniques to reduce the level of noise in the passenger cabin emanating from aircraft engines and other sources. By providing an appropriate "canceling" tone at some point between the source(s) of the noise and the listener, the effect of the noise upon the listener can be effectively reduced. Typically, this canceling tone is provided by audio speakers or other vibrating devices located near the cabin, resulting in noise suppression throughout the passenger cabin. Alternatively, active damping can be provided by headphones or the like worn by passengers and/or crew members. Similar concepts are applied in other settings, including many industrial and commercial settings where excessive noise is present.

Conventional active damping techniques, however, typically require additional hardware (e.g. loudspeakers, tuning forks or other devices capable of producing an appropriate canceling vibration). This additional hardware can add undesirable bulk, weight and complexity to a vehicle or product. In certain implementations (e.g. aircraft, seacraft and the like), this excess weight and bulk can present significant design issues. Unmanned underwater vehicles (UUV), for example, typically require exceptional acoustic performance, yet have very stringent weight and volume requirements.

Accordingly, it is desirable to create an active acoustic damping technique that can be readily implemented without excessive additional hardware. Further, it is desireable to create systems and techniques that are capable of actively canceling acoustic reverberations in vehicles and the like without adding substantial weight or bulk. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, a new system and technique provides active acoustic damping with a motor or similar propulsive element such as a multi-phase brushless direct current (DC) motor. To produce the appropriate canceling effect with the motor, the relationship between the operating mode of the motor and the noise produced is observed. This data can be used to identify a relevant transfer function that can be applied to produce a control signal for the motor. For a multi-phase motor, the current control signals provided to at least one phase may be made asymmetric with respect to the other phases to produce actuating forces upon the motor. This actuating force can be used to modify acoustic signals produced by the motor. The active acoustic damping techniques may be applied in any vehicles or devices, including unmanned underwater vehicles (UUVs), in either an open loop or closed loop manner.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, active acoustic damping of unwanted noise is provided with an electric or other motor that also produces drive power. In one embodiment, angular segments of the motor are allocated as magnetically independent acoustic actuation regions. A controller assembly based upon acoustic sensor inputs and coupling functions actuates the independent coils to allow for both motor drive and acoustic damping, as appropriate.

Generally speaking, the concept of simultaneously using a motor for propulsion as well as for noise reduction can be applied in a number of ways. In various embodiments, a relevant transfer function relating operation of a multi-phase motor to noise is determined by, for example, placing one or more noise sensors within the system and providing a stimulus to each motor phase (as described more fully below) to determine the response for that phase. The response data can be used to determine an appropriate inverting transfer function, which in turn can be applied as a filter to measured noise data during operation. The output of the filter can then be used to adjust the control commands provided to one or more phases of the motor to reduce the level of noise produced. Similarly, the noise signature of a vehicle or the like can be reduced by applying "pre-corrections" to the motor phase currents. These pre-corrections may be determined by, for example, determining appropriate responses for various speeds and load points to create a modifying waveform that can be applied to the motor control commands as appropriate. These and other embodiments and applications are described more fully below.

As used herein, the term "substantially" is intended to encompass the specified ranges or values, as well as any variations due to manufacturing, design, implementation and/or environmental effects, as well as any other equivalent values that are consistent with the concepts and structures set forth herein. Although numerical tolerances for various structures and components will vary widely from embodiment to embodiment, equivalent values will typically include variants on the order of plus or minus fifteen percent or more from those specified herein.

Figure 1:
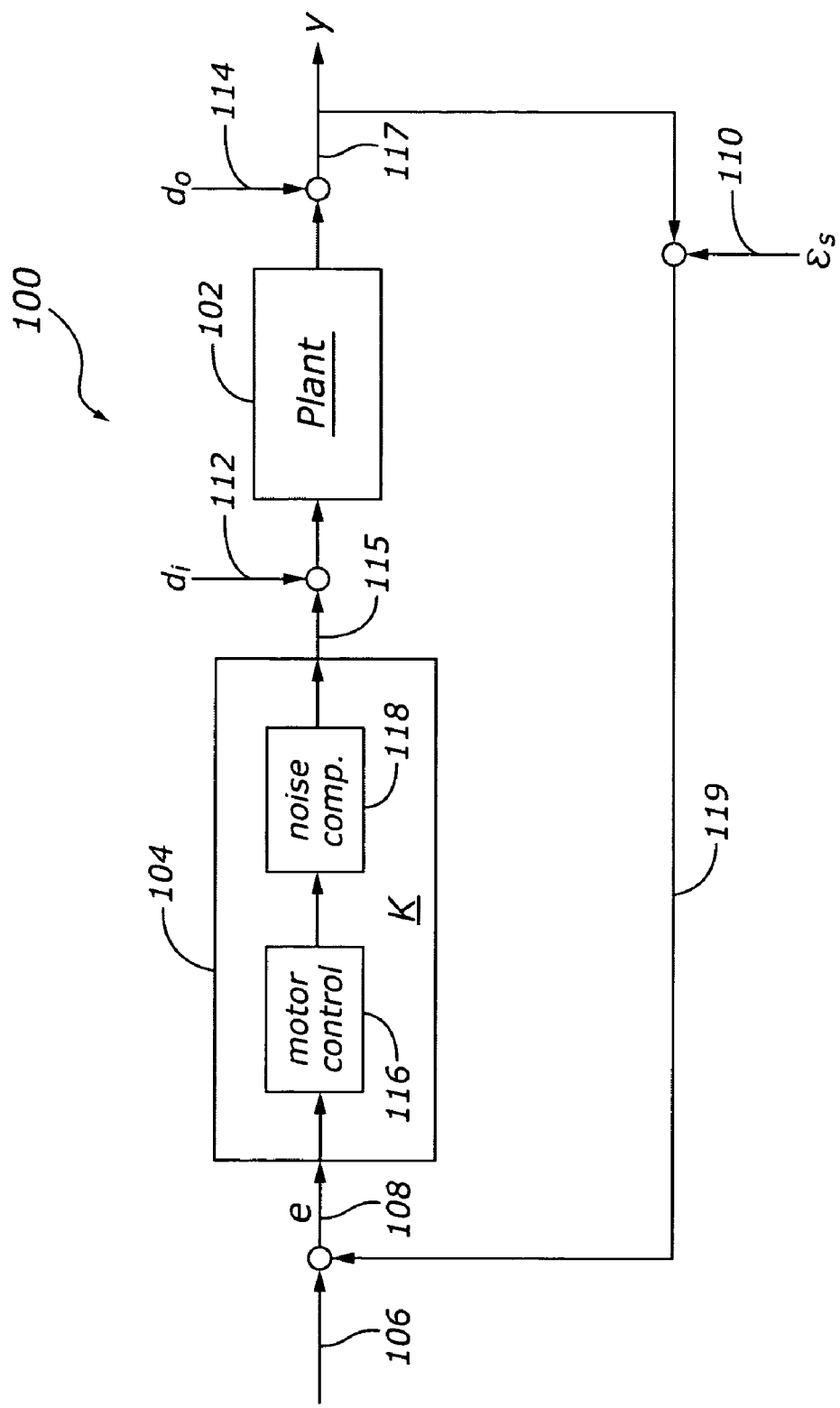
FIG. 1 is a block diagram of an exemplary control system incorporating active acoustic damping.

Turning now to the drawing figures and with initial reference to FIG. 1, an exemplary control system 100 suitably includes a controller 104 or other compensator providing a control signal 115 to a plant 102, which is any controlled system such as a motor, actuator, pump or other device capable of producing mechanical energy. As appreciated from conventional control theory, controller 104 is designed such that the behavior 117 of plant 102 (shown as "y" on FIG. 1) tracks a reference command 106 (shown as "r" in FIG. 1) even though input and output disturbances 112 and 114 (respectively), sensor errors 110 and other disturbances or inaccuracies may be present in the system. Reference command 106 may correspond to an input command received from an operator or user, for example, or may be any other input capable of producing desired results from control system 100. Although control system 100 is shown in closed loop form (i.e. using feedback 119 to improve the stability of the system), alternate embodiments may operate in an open loop manner (i.e. without the use of feedback 119), as described more fully below.

Controller 104 processes input signals 108 to produce suitable output signals 115. In various embodiments, controller 104 includes a plant control module 116 that generates control signals 115 for driving plant 102 to a desired output 117 during operation. In addition to controlling the operation of plant 102, however, controller 104 also includes appropriate logic 118 that generates signals 115 that actuate, vibrate or otherwise displace some portion of plant 102 as appropriate to provide active acoustic damping, as described more fully below. While modules 116 and 118 are shown as separate conceptual modules in FIG. 1, practical embodiments may combine or organize the actual digital logic, modules and instructions executed by controller 104 in any manner.

Control signals 115 provided to plant 102 are generated using conventional control techniques. In particular, one or more transfer functions may be identified that relate various inputs provided by signals 115 to results observed using feedback 119. Typically, noise from plant 102 is monitored over a period of time to identify a relevant transfer function. Kalman filter models, for example, may be used to estimate the transfer functions from observed data relating noisy plant output data 119 to various control signal plant inputs 115. In such cases, a least squares criterion or the like may be used to construct optimal linear estimates based upon first and second order statistics for each noise source. Alternatively, other state estimator and/or observer techniques may be used to determine an appropriate transfer function for plant 102 using the spectral response observed from various input signals. When an appropriate transfer function is identified, the function may be applied to measured noise data to produce modified control signals 115. Controller 104 is thusly able to generate control signals 115 using the transfer function to cancel or reduce the level of resultant acoustic noise within system 100.

Figure 2:
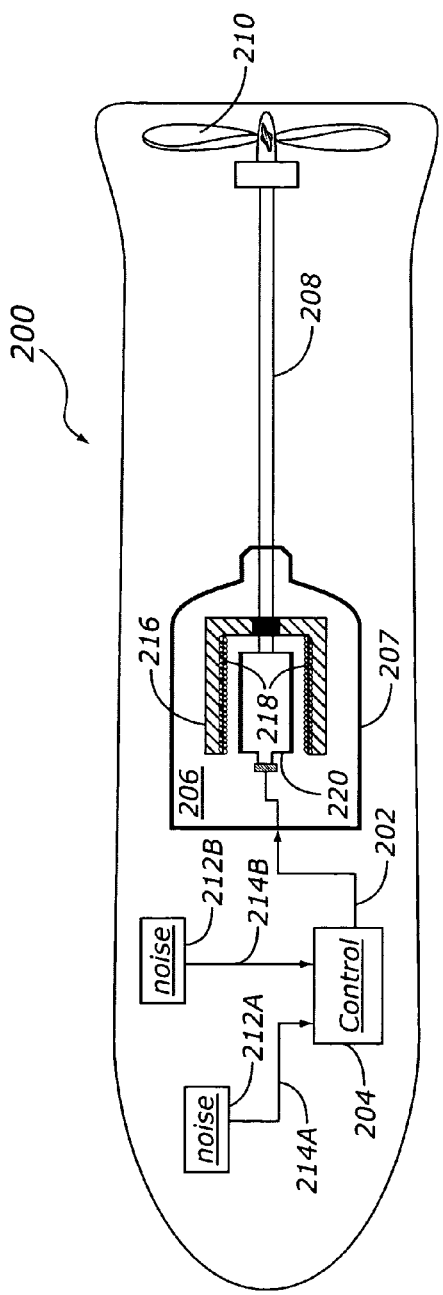
FIG. 2 is a block diagram of an exemplary vehicle incorporating active acoustic damping.

With reference now to FIG. 2, an exemplary device 200 having active acoustic damping suitably includes a motor 206 or other source of mechanical energy. In embodiments wherein device 200 is an aircraft or watercraft, the energy produced by motor 206 suitably rotates a driveshaft 208 that is coupled to an impeller 110 as shown in FIG. 1. The mechanical energy produced is appropriately determined by controller 204, which generates control signals 202 for motor 206 in response to sensor inputs 214A–B received from one or more acoustic sensors 212A–B (respectively). Control signals 202 are suitably generated to produce desired results from motor 206, and are adjusted to actively dampen the amount of acoustic noise measured at sensors 212A–B.

Motor 206 is any source of mechanical energy. Energy produced by motor 206 may be used for any suitable purpose, such as to turn a driveshaft 208, which may be coupled to a propeller, impeller 210, vehicle transmission, valve actuator or the like. In an exemplary embodiment, motor 206 is an electric motor, although similar concepts could be applied to pneumatic motors, hydraulic motors and the like in a wide array of alternate embodiments. In embodiments wherein motor 206 is an electric motor, motor 206 includes a conventional stator 216, rotor assembly 220 and the like contained within a suitable housing 207. Stator 216 is typically configured with one or more electromagnets made up of an electrically-conducting coil 218 wound around a conductive core. Rotor 220 suitably includes two or more permanent magnets formed from, for example, alnico material or the like. Each coil 218 is capable of forming an electromagnet that produces appropriate attractive and/or repulsive force to the magnetic poles of rotor 220. By varying the electrical current flowing through each coil 218, the behavior and output of motor 206 can be appropriately controlled to produce desired results. In a further embodiment, stator 216 includes multiple angular segments (called "phases" herein) allocated as magnetically-independent acoustic actuation regions. Each of these phases may be independently controlled to produce both motor drive and acoustic damping, as appropriate, and as described more fully below.

Other alternate embodiments or motor 206 may reverse the respective positioning of the coils 118 and permanent magnets within motor 206 such that rotor 220 includes coils 118 forming electromagnets and stator 216 is fashioned as a permanent magnet. Alternatively, both stator 216 and rotor 220 may be fashioned with electromagnets. Accordingly, the particular mechanical and electrical structure of motor 206 may vary widely from embodiment to embodiment.

Acoustic sensors 212A–B are any devices or systems capable of detecting acoustic signals propagating within device 200 and of providing a measurement 214A–B that is indicative of the levels, frequency and/or other characteristics of signals received. Various embodiments of sensors 212A–B are electronic sensors including one or more transducers to convert acoustic (mechanical) energy to a representative electrical or electronic form. Measurement signals 214A–B may be provided from sensors 212A–B in any digital or analog format, and/or measurement data may be stored within sensors 212 for subsequent retrieval.

Typically, device 200 will include one or more acoustic sensors 212 at various "listening points". Although two sensors are shown in FIG. 2, alternate embodiments may have any other number of sensors from one to dozens, hundreds or even thousands depending upon the processing capabilities of controller 204. If device 200 is a vehicle (e.g. a UUV), for example, various sensors 212 may be placed on the vehicle hull, with the various sensor locations noted with respect to a "heads up" or other reference position. It is not necessary that the same sensors 212 used to identify the noise transfer function(s) be used for providing feedback data to controller 204. Indeed, in various "open loop" embodiments, some or all sensors 212 are not used for feedback purposes during motor operation, but rather are used solely to obtain data used to compute suitable transfer functions for noise produced within device 100. Accordingly, the "listening points" used for measurement data need not correspond to the sensor points used for obtaining initial transfer function data in all embodiments.

Controller 204 is any system of device capable of producing appropriate control signals 202 for motor 206. In various embodiments, controller 204 is implemented with any type of digital computer, microcontroller, digital signal processor, microprocessor or the like, typically in association with digital memory, input/output (I/O) circuitry and other conventional data processing components as may be appropriate. Controller 204 further includes suitable processing instructions and modules that may be created in any programming or scripting language, and that may be organized and executed in any manner. An example of a controller for a multi-phase direct current (DC) brushless electric motor is shown in commonly assigned U.S. Pat. No. 6,642,683B1, although any control circuitry and/or techniques may be used in a wide array of alternate embodiments.

In operation, then, controller 204 provides appropriate control signals 202 to motor 206 to dampen or otherwise compensate for noise observed by sensors 212A–B. In this sense, control signals 202 are generally analogous to control signals 115 provided to plant 102 in FIG. 1, and measurement signals 214A–B may be generally analogous to the feedback signals 119 shown in FIG. 1 in closed loop embodiments. Accordingly, by using conventional control techniques, a transfer function between control signals 202 and noise measurements 214A–B can be identified and exploited to reduce or eliminate the noise observed by acoustic sensors 212A–B. Controller 204 therefore processes measurement signals 214A–B using the transfer function to generate control signals 202 that produce acoustic signals with motor 206 to cancel or otherwise dampen undesirable acoustic noise in any manner, such as described below. These control signals 202 may be further adjusted during operation to further dampen or reduce undesired noise within device 200 in some embodiments.

Motor 206 can be controlled to produce acoustic signals in any manner. In an exemplary embodiment, coils 218 of motor 206 can be driven in a manner-similar to an audio speaker to produce acoustic vibration of rotor 220 with respect to stator 216. This can be accomplished by passing an appropriate current through one or more coils 218 to affect the attraction and/or repulsion of rotor 220 and stator 216 during rotation. In a further embodiment, stator 216 includes multiple independently-addressable phases that can be used to provide actuation at various radial positions of rotor 220, thereby generating acoustic signals at a wide variety of magnitudes, phases and frequencies. In a three-phase motor 206, for example, the three distinct phases can be asymmetrically controlled to produce the desired actuation of motor 206.

Figure 3:
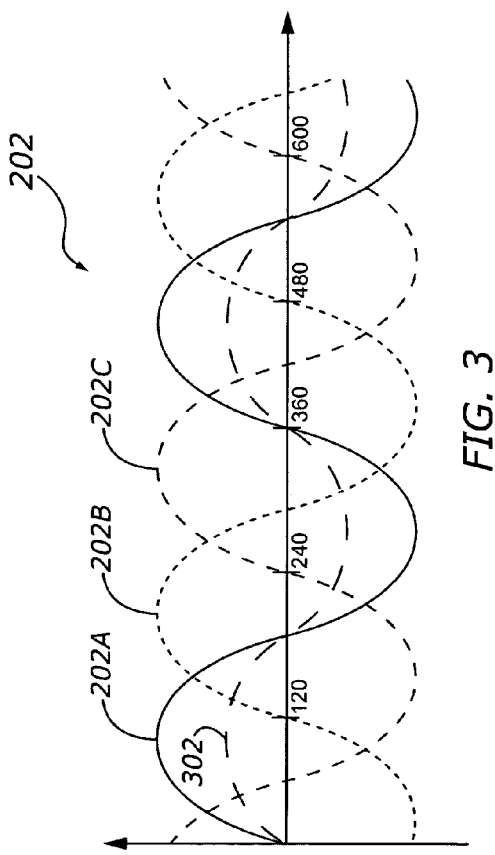
FIG. 3 is a plot of exemplary logic signals applied to an exemplary electric motor to implement active acoustic damping.

One technique for applying an actuating force upon motor 206 is described with reference to FIG. 3. In this exemplary embodiment, control signal 202 produced by controller 204 has multiple phases 202A–C, each provided to a different acoustic actuation region/phase of coil 218. In a conventional three-phase motor, for example, the various currents applied to coils in each phase are typically designed to be substantially equal in frequency and magnitude, but shifted in phase. Typically, the three phased signals are provided 120 degrees out of phase with each other, as shown by signals 202A, 202B and 202C in FIG. 3. Although the various signals shown in FIG. 3 are generally sinusoidal in shape, various equivalent embodiments may use sawtooth, trapezoidal or other control signal waveforms.

If each of the phased signals have equal magnitude, the various forces applied on rotor 220 are equal in sign but provided in opposing directions, resulting in no overall effect other than a pure torque produced by motor 206. If the magnitude, phase or frequency of one or more phases is changed with respect to the other phases, however, the forces provided by the various phases 202A–C no longer cancel, resulting on a displacing force applied to rotor 220 in addition to the torque produced. If the magnitude of signal 202A is reduced to that of signal 302 in FIG. 3, for example, the net effect will be a force that displaces rotor 220 in the plane of coils 218 receiving the reduced-magnitude signal. By applying force in this manner, rotor 220 can be made to vibrate with respect to stator 216, thereby resulting in an acoustic signal. The frequency, phase and magnitude of the resultant signal may further be modified and controlled by varying the relative control signals 202A–C provided to the various actuating phases in motor 206. Stated another way, acoustic signals may be produced by motor 206 by applying non-symmetric currents to the various phases of a multi-phase motor. These acoustic signals may be used as counter-tones to cancel some or all of the acoustic noise produced by motor 206 or any other element within device 200.

Figure 4:
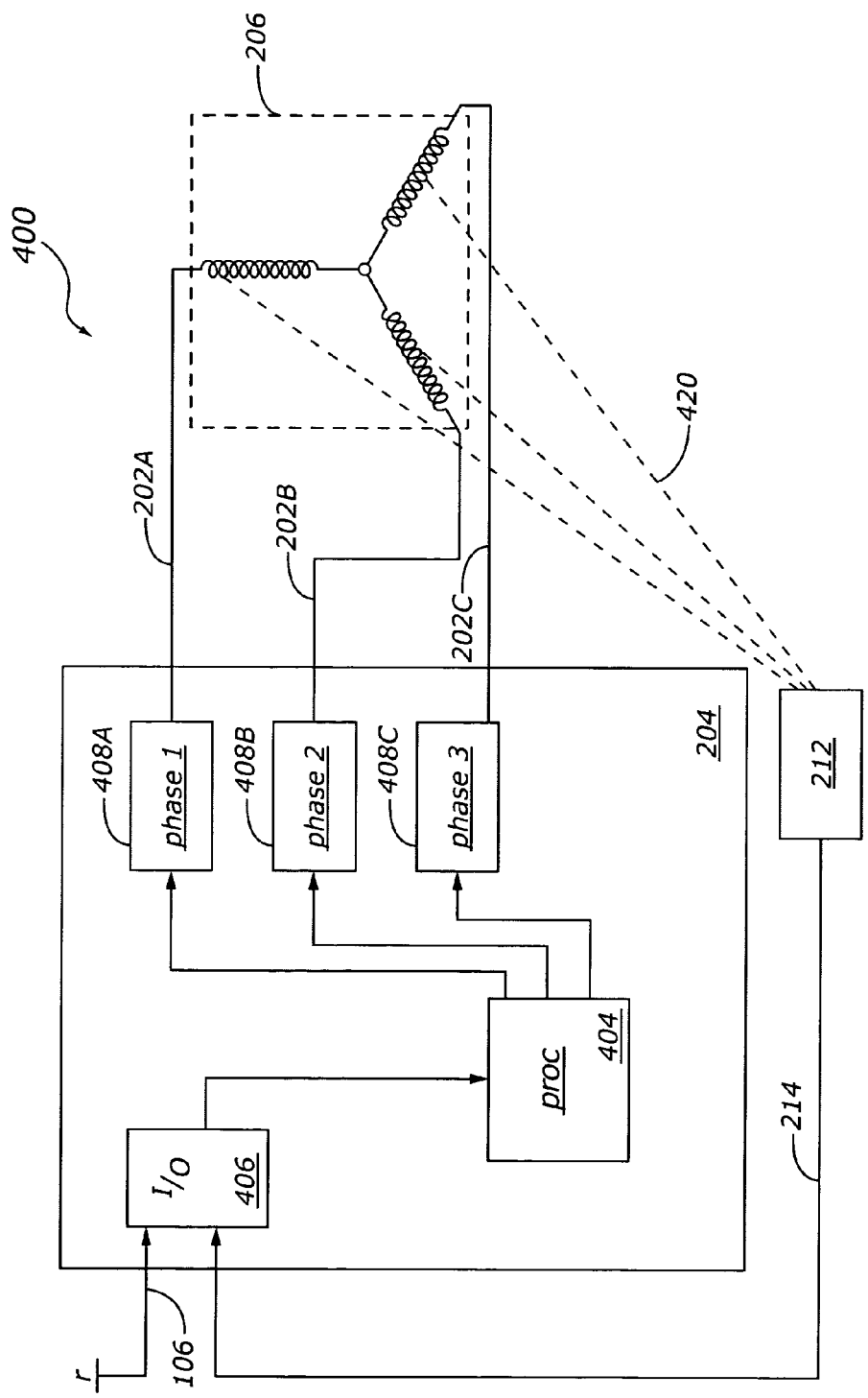
FIG. 4 is a block diagram of an exemplary control system implementing acoustic damping within a multi-phase motor.

Turning now to FIG. 4, an exemplary control system 400 for implementing multi-phase active acoustic damping suitably includes a controller 204 providing multiple control signals 202A–C, one to each phase of the multi-phase motor 206. Acoustic signals 420 produced by motor 206 are monitored at a sensor 212, which provides a measurement signal 214 back to controller 204 as described above.

Controller 202 suitably includes an input/output module 406, a data processing module 404 and one or more output modules 408A–C as appropriate. Each of the modules shown in FIG. 4 are intended as logical modules showing the various functions carried out by controller 204; practical implementations may therefore include fewer modules, additional modules and/or modules that are organized or grouped differently from those shown. Actual implementations of controller 204, for example, will likely combine the software modules or other instructions used to implement modules 404 and 408A–C into a single application, applet, module or the like.

Input/output module 406 suitably receives acoustic noise/signal measurement data 214 from sensor 212 using any serial or parallel arrangement to receive analog or digital signals in any format. I/O module 406 also receives any reference data 106 that may be provided from an operator, sensor or other source to control the operation of motor 206. This data is arranged into a suitable digital format and provided to processing module 404 as appropriate.

Data processing module 404 appropriately receives the formatted measurement data and/or reference data and processes the data received to produce appropriate control signals 202 for motor 206. As described above, the control signals are produced using a transfer function obtained through observation of various inputs provided to motor 206, or though any other technique. Control signals 202 are suitably produced to generate appropriate motor performance in view of reference data 106, but also to actively dampen acoustic noise using motor 206 as an actuator. As described above with reference to FIG. 3, motor 206 can be actuated to produce acoustic signals by providing asymmetric control signals 202A–C to the various phases of motor 206 as appropriate. One technique for producing asymmetric control signals 202A–C involves modulating one or more control signals 202A–C with an appropriate noise cancellation waveform to produce desired vibrations. Alternatively, the phase, magnitude and/or frequency of one or more control signals 202A–C can be modified to produce the desired resultant force upon one or more coils in motor 206.

As stated above, the structures and concepts set forth above may be applied in any manner. In various embodiments, open or closed loop control techniques may be used to provide simultaneous propulsion and noise reduction using a multi-phase brushless DC motor or the like, particularly for a UUV or other vehicle. In such embodiments, various sensors 212 are placed on the vehicle hull, with the location of each sensor known with respect to a "heads up" or other reference position. A hull response is then determined for each phase of the motor. Hull responses may be determined through simulation techniques, for example, or by observing the noise responses produced by controlled inputs to the various motor phases. Observation data may also be obtained for various operating speeds, loading conditions, etc. During the observation period, the motor position relative to the reference position (e.g. heads up) should be observed to preserve the phasing of the transfer functions determined from the observation data. Data obtained through observation may then be processed to determine an inverting transfer function that can be applied to measured noise data, as described above. The transfer function may be determined using any conventional mathematical or data processing technique. If the sensor locations used during the observation period differ from the sensor locations used during measurement and/or operation, then a series of measurements may be further obtained to correct for the new locations. In this manner, the transfer functions obtained during observation may be applied to individual measurements and/or to any number of sensors located in or on the vehicle.

After the transfer function is determined, the function may be applied to determine appropriate motor phase current commands, as described above. This application may take place in a closed loop manner (i.e. by adjusting the control signals based upon noise sensed at one or more listening points), or in an open loop manner (i.e. by applying control signal adjustments based upon factors other than feedback data). In the later case, a commutation waveform may be created using the data observed above that pre-corrects for noise generated by motor 206 (as well as any associated structures, e.g. bearings, propeller, etc.). This commutation waveform may be varied based upon the operating state of motor 206 and/or device 200, such as speed, loading and/or any other factors. Again, any number of motor phases may be adjusted (e.g. as described above in conjunction with FIG. 3) to produce the desired reduction in noise.

While at least one exemplary embodiment has been presented in the foregoing detailed description, it should be appreciated that a vast number of variations exist. The concepts described herein with respect to electrically-powered underwater vehicles, for example, are readily applied to other motor-driven vehicles (e.g. aircraft, automobiles and the like) as well as other devices such as lawnmowers, leaf blowers, golf carts, snow blowers, pumps and the like. Similarly, the various mechanical structures described herein are provided for purposes of illustration only, and may vary widely in various practical embodiments. Accordingly, the various exemplary embodiments described herein are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that numerous changes can be made in the selection, function and arrangement of the various elements without departing from the scope of the invention as set forth in the appended claims and the legal equivalents thereof.

What is claimed is:

1. A method of reducing noise in a vehicle propelled by an electric motor having a plurality of phases, the method comprising the steps of:
   observing noise produced within the vehicle for at least one of the plurality of phases;
   determining a transfer function between the noise produced by the at least one of the plurality of phases; and
   applying the transfer function to produce a control signal for the motor, wherein the control signal is asymmetric with respect to the at least one of the plurality of electrical phases to thereby adjust acoustic signals produced by the electric motor.

2. The method of claim 1 wherein the applying step comprises generating the control signal so as to reduce the noise produced within the vehicle with the acoustic signals.

3. The method of claim 1 further comprising the step of adjusting the control signal for the motor in response to feedback measurements obtained by an acoustic sensor.

4. The method of claim 1 further comprising the step of adjusting the control signal for the motor in response to a change in vehicle speed.

5. The method of claim 1 further comprising the step of adjusting the control signal for the motor in response to a change in vehicle loading.

6. A device having active acoustic damping, the device comprising:
   a motor comprising a plurality of independently actuatable regions;
   a noise sensor configured to measure a noise and to provide a noise measurement as a function thereof and
   a controller configured to receive the noise measurement and to provide a control signal to the motor as a function of the noise measurement, wherein the control signal comprises a plurality of phases, each phase corresponding to one of the independently actuatable regions, and wherein the controller is further configured to adjust the plurality of phases with respect to each other to thereby produce acoustic vibrations with the motor.

7. The device of claim 6 wherein the vibrations are configured to cancel at least a portion of the noise measured by the noise sensor.

8. The device of claim 6 wherein the controller is further configured to produce the control signal using a transfer function of the noise.

9. The device of claim 6 wherein the device is a vehicle.

10. The device of claim 6 wherein the device is an unmanned underwater vehicle (UUV).

11. A method of actively damping a noise with a motor, the method comprising the steps of:
obtaining a measurement of the noise;
processing the measurement to produce a control signal for the motor as a function of the noise; and
providing the control signal to the motor to thereby adjust an acoustic signal produced by the motor, wherein the acoustic signal is configured to produce a tone that cancels at least a portion of the noise.

12. The method of claim 11 wherein the processing step comprises applying an inverting transfer function to the measurement.

13. The method of claim 11 wherein the control signal comprises a plurality of phase controls, each provided to an independently-actuatable phase of the motor.

14. The method of claim 11 wherein the processing step comprises altering one of the plurality of phase controls to be unequal to the remaining phase controls.

15. The method of claim 14 wherein the altering step comprises altering a magnitude of the unequal one of the plurality of phase controls.

16. The method of claim 14 wherein the altering step comprises altering a frequency of the noise canceling portion.

17. A noise canceling control system for a motor, the control system comprising a processor and memory coupled to a noise sensor, wherein die memory is configured to store instructions for the processor, the instructions comprising:
a first code module configured to receive a noise measurement from the noise sensor; and
a second code module configured to provide a control signal to the motor in response to the noise measurement to thereby produce a vibration with the motor, wherein the vibration produces a tone configured to cancel at least a portion of the noise at the noise sensor.

18. A noise-canceling control system for a device having a motor, the control system comprising:
means for generating a control signal for the motor, wherein the control signal comprises a plurality of phases; and
means for adjusting at least one of the plurality of phases of the control signal to thereby produce a vibration with the motor, wherein the vibration produces a tone that cancels at least a portion of the noise.

19. A noise-canceling control system for a device having a motor, the control system comprising:
means for receiving a measurement of the noise;
means for processing the measurement to produce a control signal for the motor as a function of the noise; and
means for providing the control signal to the motor to thereby adjust an acoustic signal produced by the motor, wherein the acoustic signal is configured to produce a tone that cancels at least a portion of the noise.

20. A system for reducing noise in a vehicle propelled by an electric motor having a plurality of phases, the system comprising:
means for observing noise produced within the vehicle for at least one of the plurality of phases;
means for determining a transfer function between the noise produced by the at least one of the plurality of phases; and
means for applying the transfer function to produce a control signal for the motor, wherein the control signal is asymmetric with respect to the at least one of the plurality of electrical phases to thereby adjust acoustic signals produced by the electric motor.

* * * * *